(12) United States Patent
Palmas (10) Patent No.: US 10,882,798 B2
(45) Date of Patent: Jan. 5, 2021

(54) PLANT AND PROCESS FOR FAST HUMIFICATION AND BIOSTABILIZATION AND PRODUCT OBTAINED THEREFROM

(71) Applicant: Fasthum S.r.l., Cagliari (IT)

(72) Inventor: Costantino Palmas, Settimo San Pietro (IT)

(73) Assignee: Fasthum S.r.l., Cagliari (IT)

( * ) Notice: Subject to any disclaimer, the term of this patent is extended or adjusted under 35 U.S.C. 154(b) by 0 days.

(21) Appl. No.: 15/328,512

(22) PCT Filed: Jul. 24, 2015

(86) PCT No.: PCT/IB2015/055624
§ 371 (c)(1),
(2) Date: Jan. 24, 2017

(87) PCT Pub. No.: WO2016/012986
PCT Pub. Date: Jan. 28, 2016

(65) Prior Publication Data
US 2017/0210676 A1    Jul. 27, 2017

(30) Foreign Application Priority Data
Jul. 24, 2014 (IT) .............................. MI2014A1349

(51) Int. Cl.
*C05F 17/20* (2020.01)
*C05F 17/30* (2020.01)
(Continued)

(52) U.S. Cl.
CPC .............. *C05F 17/20* (2020.01); *C05F 17/30* (2020.01); *C05F 17/90* (2020.01); *Y02P 20/145* (2015.11); *Y02W 30/40* (2015.05)

(58) Field of Classification Search
None
See application file for complete search history.

(56) References Cited

U.S. PATENT DOCUMENTS 3,831,288 A * 8/1974 Stribling .................. A01C 3/00
34/259
5,853,450 A * 12/1998 Burnham ................ C02F 11/16
71/9

(Continued)

FOREIGN PATENT DOCUMENTS

CA    2021411    1/1991
EP    0408946    1/1991
(Continued)

OTHER PUBLICATIONS

International Search Report and the Written Opinion dated Jan. 14, 2016 From the International Searching Authority Re. Application No. PCT/IB2015/055624. (11 Pages).

*Primary Examiner* — Wayne A Langel (57) ABSTRACT

A process for fast humification and non-fermentative biostabilization of solid and/or liquid, vegetal and/or animal organic material, comprising the following phases:
- an initial phase of preparation and pre-treatment of said organic material, for preparing activated and mixed material brought to a substantially neutral pH;
- a next phase wherein said activated and mixed material at a substantially neutral pH is treated in a reactor, in which it is re-mixed and irradiated with radio frequencies conveyed by waveguides for a given time;
- a final phase of post-processing the material treated in the reactor, adapted for producing a biostabilized organic product.

6 Claims, 4 Drawing Sheets

(51) Int. Cl.
    *C05F 17/00*     (2020.01)
    *C05F 17/90*     (2020.01)

(56) References Cited

U.S. PATENT DOCUMENTS

| | | | | |
|---|---|---|---|---|
| 5,897,785 A | * | 4/1999 | Billings | C02F 1/325 |
| | | | | 210/734 |
| 5,951,947 A | * | 9/1999 | Hunt | C05F 1/00 |
| | | | | 422/21 |
| 2007/0178027 A1 | | 8/2007 | Park | |
| 2010/0058821 A1 | * | 3/2010 | Romano | C05F 17/0063 |
| | | | | 71/11 |

FOREIGN PATENT DOCUMENTS

| | | |
|---|---|---|
| EP | 1813359 | 8/2007 |
| FR | 2584709 | 1/1987 |
| JP | 2005-034727 | 2/2005 |
| WO | WO 93/01149 | 1/1993 |
| WO | WO 00/52405 | 9/2000 |
| WO | WO 2008/126114 | 10/2008 |
| WO | WO 2016/012986 | 1/2016 |

\* cited by examiner

PLANT AND PROCESS FOR FAST HUMIFICATION AND BIOSTABILIZATION AND PRODUCT OBTAINED THEREFROM

RELATED APPLICATIONS

This application is a National Phase of PCT Patent Application No. PCT/IB2015/055624 having International filing date of Jul. 24, 2015, which claims the benefit of priority of Italian Patent Application No. MI2014A001349 filed on Jul. 24, 2014. The contents of the above applications are all incorporated by reference as if fully set forth herein in their entirety.

FIELD AND BACKGROUND OF THE INVENTION

The present invention relates to the field of waste and refuse treatment of solid and/or liquid, vegetal and/or animal organic material, and more specifically to a plant and process of fast humification and bio-stabilization, and the product thus obtained.

Process of humification and bio-stabilization consists in the transformation of organic-based substances, such as for example solid wastes of organic origin (of vegetable and animal origin) or organic water waste biologically stable, non-fermentative, non-putrescible products, with a molecular structure simpler than initial material. The product resulting from the process, depending on the type of the input material, can have unique agronomic applications as a fertilizer.

Traditional kind of composting process occurs by means of the action of micro-organisms (bacteria) which transform, in a first phase, substances which are readily putrescible such as simple sugars, proteins, amino acids, into less complex substances but still not stabilized to decompose them, in a second phase, into smaller and more stable molecules in comparison to initial material, such as humic acids and fulvic acids. The final result of the industrial process, which takes place in normally large composting centres, is the so called "compost". Under the best possible conditions it will result in a stabilized and non-rifermentative rich in nutrients for plants material. Such transformation, however, requires an average period of time of 3 months, which may be up to 6 months, depending on the organic origin and conditions of the plant and process.

It is known that organic waste/refuse placed in closed containers, e.g. reactors, composting cells or others, undergo processes of biooxidation, generating bad smells, because of amines, ammonia, organic sulfides and organic sulfur compounds, which are then released during the fermentation. During process greenhouse gases are also generated such as methane and an important amount of percolate disposable at specialized plants. The production of percolates contributes to reduce the economic and environmental sustainability of organic waste recovery activity.

The most critical issues of existing plants are the following:

a) the traditional composting method requires a minimum time of three months and even a longer one depending on the nature of material origin (such as cellulose wood) and on climatic conditions, also it requires large spaces for the process realization;

b) traditional plants are a source of odours, main attractors of flies and annoying insects and election sites for their reproduction; they also produce significant quantities of contaminating percolate which must be disposed in approved facilities for hazardous waste treatment;

c) uncertainty of final product resulting from a process related to a number of uncontrollable variables makes the system unstable.

To sum up, the main problems observed in known plants are: long downtimes, large areas of processing and storage, odours emissions, percolate production, instability of final product and consequential costs.

WO2008/126114-A1 describes an organic material transformation process for the production of a fertilizer substrate, comprising the phases of milling organic material, its fermentation, treatment in a reaction chamber with a microwave generator for bacterial charge removal and its transformation. This process thus described is unfeasible, as the two phases are obviously incompatible: it is unlikely that a bacterial fermentation phase could coexist with a strongly destructive treatment as the one coming from a microwave source.

SUMMARY OF THE INVENTION

Therefore, the subject of the present invention is to propose a fast humification and bio-stabilization plant and process, and product thus obtained, aimed at overcoming all the aforesaid drawbacks.

Fast humification process of organic waste/refuse object of the invention allows bio-stabilization, organic material recovery and innovative fertilizers production.

Fast humification process object of the invention is carried out by means of physicochemical transformations, with a fast cellular and molecular degradation that occurs as a result of microwave sources treatment. The process object of the invention is developed throughout a required scan of material to transform. The process essence is the treatment reactor described hereinafter. Any organic material can be transformed by means of the aforementioned process, but while it induces an accelerated degradation on intact cells, it determines stabilization on non-intact cells, in which degradation processes are already started. That is to say that in all possible mixes of intact and non-intact cells, it intervenes in intact ones inducing rapid degradation and in those degraded by stabilizing the processes in progress; generally, it blocks in any case the ongoing fermentative processes.

The innovative technology uses a non-fermentative process which is able to transform organic material without producing percolate and odours.

This fast humification process can be applied to solid waste of organic origin (vegetable and animal) as well as to liquid organic waste, to facilitate their rapid transformation into biostabilized, chemically and physically modified products.

Fast humification process object of the invention has the following characteristics:

it has the ability to decompose organic substances in a non-fermentative manner, promoting degradation process by aggregating complex molecules into simpler and stable molecules, with no gas emissions and percolate;

it produces a product with particular properties whose aim is fertilizing agricultural land and facilitating roots absorption;

it is usable for stabilization of biodigester or partially fermented and not yet completely degraded products;

it is applicable for inerting waste and organic liquid refuse.

It is an object of the present invention a fast humification and non fermentative biostabilization process of vegetable and/or animal, solid and/or liquid organic material, comprising the following phases:

An initial phase of preparation and pre-treatment of said organic material, suitable to prepare activated material, mixed and brought to substantially neutral pH;

A following phase wherein said activated material, mixed at substantially neutral pH is treated in a reactor, in which it is re-mixed and irradiated by means of radio frequencies conveyed by waveguides for a determined time;

A final phase of post-process of treated material in the reactor, adapted to produce an organic biostabilized product.

It is an object of the present invention a fast humification and bio-stabilisation plant and process, as better described in the claims, as well as a product thus obtained, which form an integral part of the present description.

BRIEF DESCRIPTION OF THE SEVERAL VIEWS OF THE DRAWINGS

Further objects and advantages of this invention will become apparent from the detailed description which follows, an example of embodiment (and of its variants) is thereof disclosed, and with reference to the attached drawings given merely for an illustrative and not limitative purpose, wherein:

In FIGS. 1.1, 1.2 a general diagram of a first variant of fast humification plant object of the present invention is shown, in the case of solid type substances to be treated;

in FIGS. 3.1, 3.2, 3.3, 3.4 perspective views of an embodiment example of the plant reactor are shown.

The same figures and the same reference letters in figures identify the same elements or components.

DESCRIPTION OF SPECIFIC EMBODIMENT OF THE INVENTION

The fast humification process object of the invention consists in organic substances transformation into a biostabilized and humified, not putrescible product, with the advantage of being carried out quickly in the absence of percolate and bad odours, if compared to slow process of natural humification.

The fast humification process is achieved through synergy of physical and mechanical actions which interrupt the natural decomposition process; fast cell degradation induced by radio frequencies treatment blocks fermentation processes taking place in the percentage of cells in which putrefaction process is started, and it accelerates humification in still intact cells. The result is a fast humification with a practically odourless, stable and with relative scalable humidity product.

Process may be further accelerated by a special preparation of solid product to be treated which is previously minced and mixed by means of process additives and activators, suitably dosed in the material being processed.

The process provides the following phases:

An initial phase of preparation and pre-treatment of vegetable and/or animal, solid and/or liquid organic material, adapted to prepare activated material, mixed and brought to a controlled pH; this phase may comprise the following sub-phases:

The material to be treated is first deprived of unsuitable extraneous fractions (iron, aluminium, metals, plastics, etc.);

Then, it is fed into a shredder/mixer to reduce it to a size (usually less than 5 cm) consistent to the material to be treated and the product to be obtained;

later, an additive/activating material is moistened into the agitated product and left there for the minimum required contact time (usually 10 minutes); this additive/activating product is a compound containing the following elements: Calcium, Iron, Nitrogen, Magnesium, Zinc, Nickel, Chromium, Copper, Cobalt, Phosphorus, Oxygen in a composition suitable for not releasing harmful residues in the final product: its composition is variable depending on the waste to be treated;

A following phase wherein the activated material, mixed and brought to substantially neutral pH, preferably within a range of values between pH 6.5 and pH 7.5, is treated in a reactor, wherein it is irradiated by radio frequency heads conveyed by waveguides for a time preferably comprised between 20 and 90 minutes, variable according to the material to be treated and to the result to be obtained;

A final post-process phase involves the possible moisture correction, and concentration, cleansing of lumps, or pelletisation may be necessary for production of bio-stabilized final organic product.

The process on the basis of used input material and activators allows obtaining mixtures containing substances stabilized organic-rich:

humines (low acidity compounds with due mainly to phenolic groups);

Humic acids (modest acidity and high molecular weight compounds 2000/3000 Da);

Fulvic acids (smaller molecules with a molecular weight <1000 Da characterized by high acidity).

With the special feature of short chain molecular structure.

An embodiment of the plant object of the invention is described below.

The plant is essentially composed of the following systems.

a) a system for the preparation and pre-treatment of the organic plant material and/or animal, solid and/or liquid, arranged to prepare the material activated, mixed and at controlled pH, which comprises one or more of the following elements:

A system of accumulation and handling of the product to be treated, which may provide a loading ramp and transport machinery.

A possible sorting or screening line for removing non-organic waste.

A possible shredding system for reducing volume of the organic material to be treated (solid waste), or a suitable pumping system for organic water waste.

A system of accumulation and organic dosing of process activator for the necessary contact time.

b) A "reactor", adapted to treat the material prepared by means of the above said systems, manufactured in stainless steel and diamagnetic material, and preferably comprising the following elements:

A treatment and reaction chamber with inspection doors equipped with special sealing systems to prevent dispersion of electromagnetic fields harmful for the operator;

A defined number of microwave irradiation heads (radio frequency) and relative control system. The microwave generators are preferably of magnetron head monoblock type, driving launch and power supply in a single containment hood with forced ventilation;

A system for mixing material, also defined stirrer;

A possible declotter for high viscosity-adhesiveness materials;

A thermal control system composed by half tube or external jacket (and heat insulation);

A system for loading and unloading product, controlled by a load cell;

An extractor of vapours produced during treatment;

Dosing and moistening systems of reagents for process parameters control;

The reactor is also equipped with an external system of forced recirculation (pump+piping valves and accessories) for water waste/liquid waste.

c) a post-process system to carry out moisture correction, and/or concentration, and/or declotting and/or pelletisation may be necessary for production of final biostabilized organic product.

d) An instrument system and PLC control, with special management software PLC/SCADA, which allows real time setting and monitoring, even remotely, all operations and process parameters, including reflected radio frequencies control.

Figure 11:
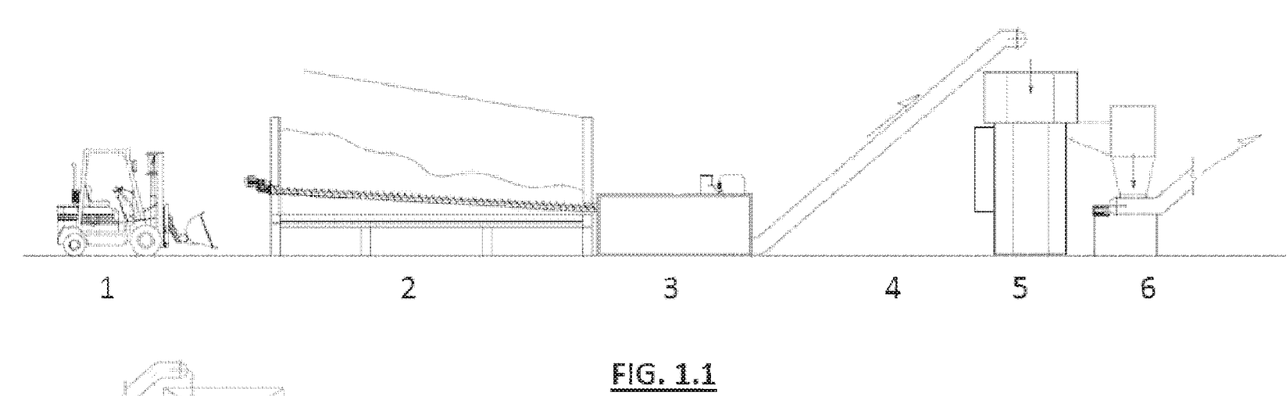
Figure 12:
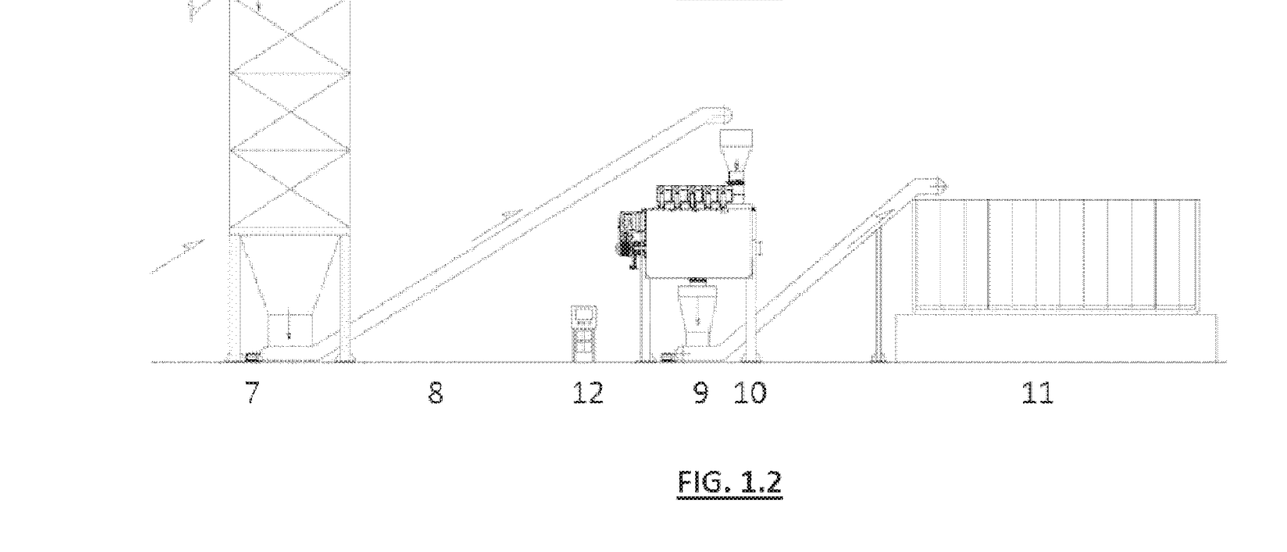
Figure 31:
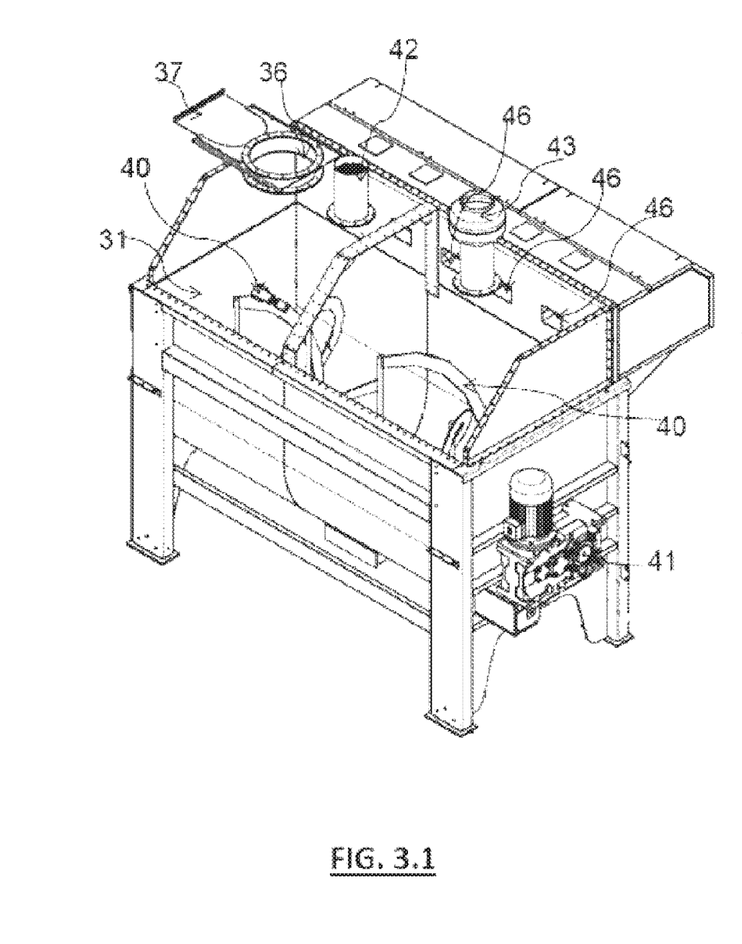
Figure 32:
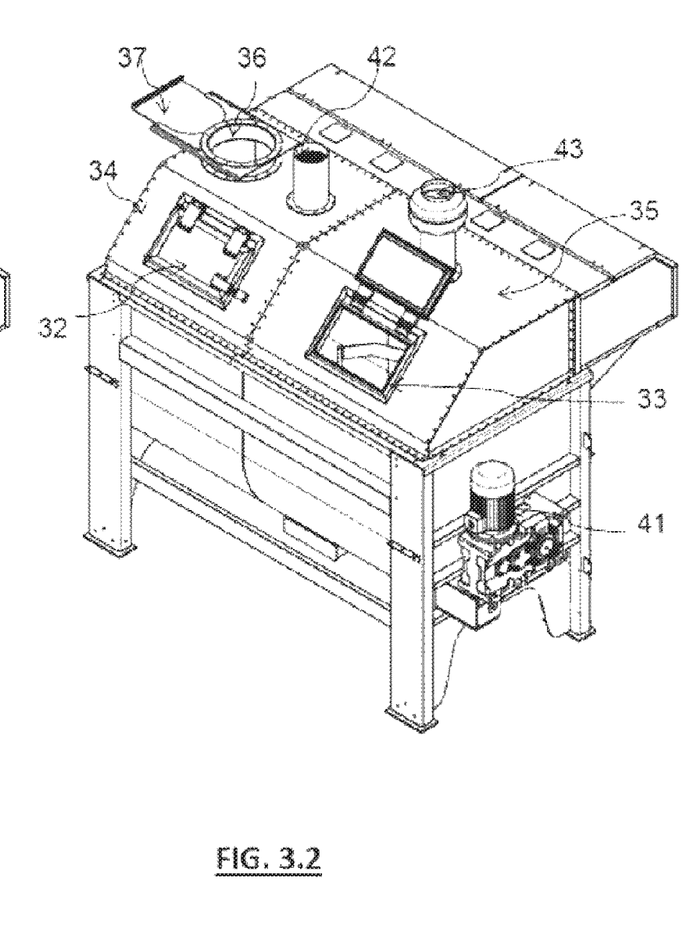
Figure 33:
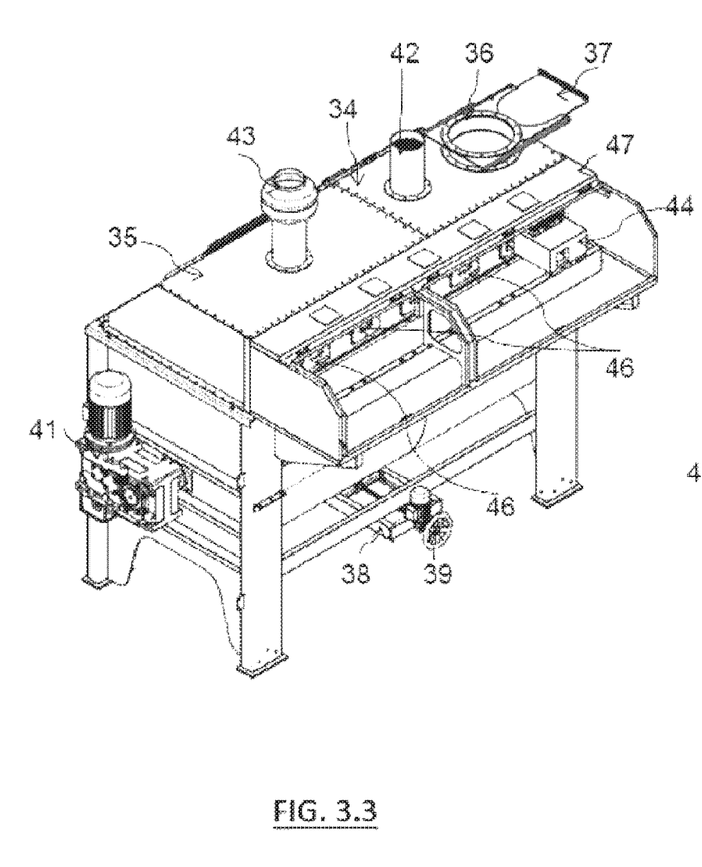
Figure 34:
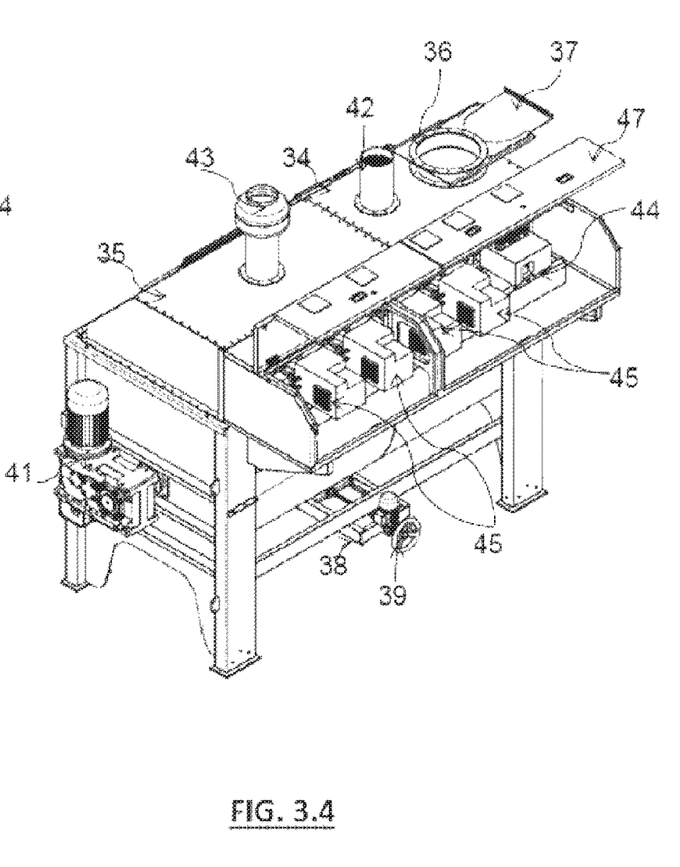

More particularly, with reference to FIGS. 1.1, 1.2, in an embodiment, the following elements of a typological plant are highlighted.

Material loading device 1;

Refrigerated tank 2 for collecting the product to be treated made of steel with conveying endless screw;

Pre-loading and inspection pan 3, with iron separator, to select and delete metals present in the material to be treated, measuring device of activating additive;

Endless screw for feeding material taken from tank 3 into shredder 4;

Shredder 5, capable of shredding material and reduce it to a suitable size for further processing;

Endless screw 6 for feeding material taken from shredder into silo 7;

Pre-treatment and intermediate storage silos 7 with inner handling system;

Unloading endless screw 8 which picks up material from silo 7 and supplies it to reactor 9;

Reactor 9, described in detail below;

Unloading endless screw 10 which picks up material from reactor 10 and supplies it to a container 11;

Container 11 for collection and storage of finished product;

Plant control system 12.

Possible systems of drying (if necessary), mixing and bagging of final product (e.g. Compost) complete the plant to allow commercialization thereof.

The plant shown in FIGS. 1.1, 1.2 is relative to a typological treatment line of selected organic solid waste, capable of treating 1000 kg/h of organic waste not contaminated by incongruous products.

Accessory equipments can be added for different types of waste, such as screens, magnetic separators or ballistic, recirculation pumps, capture systems and air extraction from storage areas.

Figure 2:
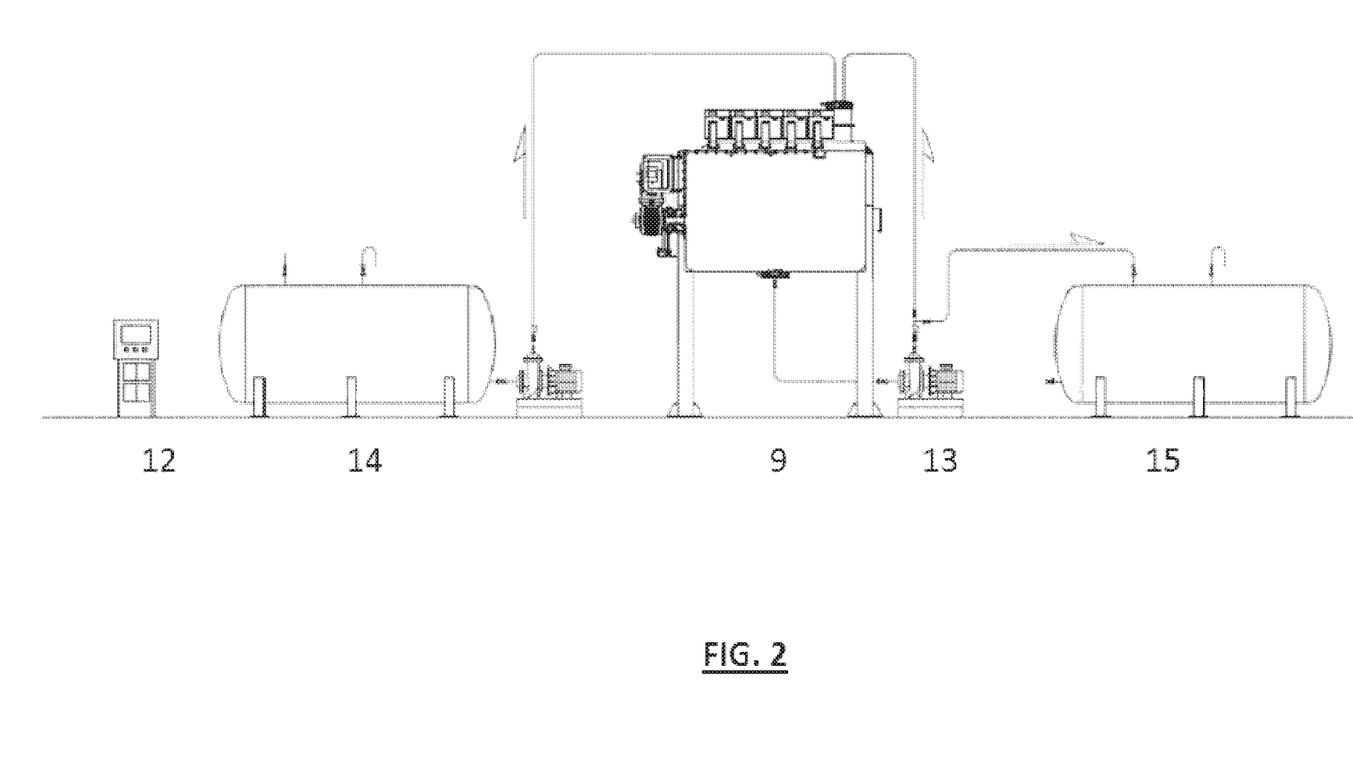
in FIG. 2 a general diagram of a second variant of fast humification plant object of the present invention is shown, in the case of liquid type substances to be treated.

With reference to FIG. 2, a variant of liquid waste treatment plant is depicted, designed to ensure absence of contact between microwave source and material to be treated.

Water waste to be treated are inserted into a tank 14 from which they are taken by means of a pump 15 and placed into reactor 9.

The reactor is equipped with an outer system of forced recirculation 13 (pump+piping+valves and accessories), which put once again the liquids in the reactor during the treatment. At the end of the treatment, the recirculation system 13 put treated water waste in a tank 15. The process is controlled by a plant control system 12. It provides essentially monitoring and controlling of:

Material weight (for loading and unloading management);

Temperature;

PH;

Treatment time (for automatic operation);

Mixer rotation speed;

Forced recirculation speed;

Radio frequencies radiation power;

Vapour extraction system operation;

Dosage of possible reagents (depending on the material).

Reactor 9 is the plant core: its innovative features are numerous. With reference to FIGS. 3.1, 3.2, 3.3, 3.4 an exemplary embodiment of reactor is depicted. In particular, FIGS. 3.1 and 3.2 show front views, respectively, without front hood, highlighting the reactor inside, and with front hood; FIGS. 3.3 and 3.4 show rear views with raised rear hood, without and with microwave irradiation heads, respectively.

The reactor is equipped with a treatment and reaction chamber 31 adapted to facilitate product loading and unloading (automatic), to facilitate periodic cleaning and disinfection and to facilitate maintenance and control operations.

An upper tilting hood is provided for access to treatment chamber, divided into two parts 34, 35, provided with respective inspection doors 32, 33 comprising safety devices which blocks the mixers rotation and irradiation in case of opening; the perimeter of inspection doors includes special devices to prevent electromagnetic disturbance, certified by measurements field remaining below law limits. On the upper hood a loading opening 36 of material to be treated is provided equipped with a closure door 37, with a sealing system.

Unloading takes place through an opening 38, on the lower of the reactor body, for example a drawer, with relative device for opening/closing 39, and sealing system.

The mixing system of material inside the reactor chamber comprises an endless screw mechanical mode stirrer 40, with rotation controlled by appropriate motorized system 41 controlled in turn by plant control system 12, which also determines rotation speed.

Upper chimney 42 provided with magnetic trap puts in communication the reactor inside with the outside, for avoiding the creation of dangerous overdepressions. An extractor of vapours from treatment (43) allows ejecting condensate produced during the process.

In case of liquid substances treatment flanges connecting pipes for loading, unloading and recirculation, are provided. They also guarantee absence of contact between radio frequencies source and liquid material to be treated.

It is also provided a system for dosing and injecting reagents for process parameters control, installed near the upper cover (35) commanded by plant control system 12.

Reactor is equipped with suitable power radio frequency generators 45, capable of determining a rapid degradation of the cell and simultaneously a bacterial, fungal and parasite reduction, until biostabilization/humification of organic materials; for organic liquids, whether of zootechnical, civil or industrial origin, radio frequency treatment leads to a physical-chemical status change, with a significant reduction of COD value (Chemical Oxygen Demand).

An example of radio frequency technology generators 45 and reactor treatment and reaction chamber is described below.

The system core consists of three basic components:

Generation system, which is the actual source of microwave energy (MW), and which incorporates microwave irradiation (magnetron) heads and system power supply;

Waveguide, which is a metallic conduit in which microwave energy propagates and gets conveyed from the generator to the process zone (applicator);

Applicator, which is a cavity or tunnel, typically of stainless steel, able to reflect microwaves, having appropriate geometry and dimensions to allow material treatment process.

Microwave generation system (radio frequency generators 45 and power supply 44 in the figures) has the task of efficiently converting electrical energy into electromagnetic energy. The generator used in our application is the magnetron; it takes advantage of the interaction of an intense electrons beam with an electromagnetic field. The beam is accelerated by means of a DC voltage in order of a few thousands volts and moves throughout the space of interaction under the influence of an intense magnetostatic field produced by a permanent magnet. Electrons perform swirling trajectories moving from cathode to anode. The anode structure supports a microwave electromagnetic field which slows electrons and a large part of their kinetic energy is transformed into electromagnetic energy, which is fed into a waveguide through a suitable antenna.

The waveguide consists of a metal pipe with a high conductivity, typically with a rectangular section, which transmits microwaves through a mechanism of multiple reflections on the walls thereof from the generator to the applicator. In the figures, waveguides, one for each generator 45, are indicated with number 46 in the upper part of reactor.

The applicator is a structure specifically designed to expose the material to be treated to radiation in an efficient, safe, reliable, repeatable and cost-effective manner. Therefore, the applicator is the fundamental element of microwave treatment system.

A particular type of multimodal applicator consists of reverberation chambers.

A reverberation chamber is a metallic electrically large hollow cavity, in which an electromagnetic environment is created, wherein the field is statistically homogeneous, isotropic, incoherent and randomly polarized.

Isotropy implies that, in a given position, electromagnetic environment statistic is the same in every direction. Homogeneity implies that all points at a certain distance from the metal surface of walls are statistically equivalent.

This peculiarity of reverberation chamber is usually obtained by the introduction into the metallic cell of one or more mechanical mode agitators, called "stirrers", which consists of conductive material and rotate in a continuous manner.

During the stirrer rotary motion, the cavity geometry is continually modified and consequently boundary conditions vary and modify the cavity modes in order to obtain a statistically uniform and isotropic electromagnetic environment.

In the reactor object of the invention the applicator consists in fact of an inner chamber 31 and the mechanical mode agitator is the mechanical metal agitator 40 with the load itself, which, due to rotational and translational motion, are in fact "mode-stirrers" as they have the effect of disturbing the electromagnetic field distribution: in this way treatment and heating homogeneity is improved.

Another important characteristic of the plant is the high ratio of field/input power, which makes it possible to create a high electromagnetic field within the structure, while using a moderate input power.

For the realization of the reactor chamber stainless steel is used which, although having higher electrical resistivity than copper and aluminium, provides a better mechanical performance, good corrosion resistance and increased weldability.

On both sides and along the middle section of the reactor chamber, generators launching guides fitting flanges are welded. Said flanges are of normalized type R 26 for guide type WR 340 and they allow housing of a gas-barrier to protect magnetron of corresponding generator.

A further finishing is constituted by crankcases 47 to support and protect generators, provided with flipping doors with key lock. In thus obtained compartments electrical circuits for supplying power to generators and hydraulic circuits for cooling the magnetron are housed.

Microwave generators are of monoblock type with magnetron head, launching guide and power supply in a single containment hood with forced ventilation.

Oscillation frequency of generator electromagnetic waves is for example 2.45 Ghz standard mode, but at the output of the same, through the interposition of multimode applicators, optimal results are obtained to generate fast oscillation and the resulting intermolecular friction of water and carbon molecules.

In a non-limiting example each microwave irradiation unit has the following characteristics:

Power consumption: from 2 to 8.5 kW (depending on the installed power unit)

MW Power output: 2.0 kW to 6 kW

Power supply: 380 V-50 Hz;

Magnetron head cooling: water;

Protection: magnetron head overheating by means of thermocouple connected on AT primary transformer power supply circuit;

MW delivery delay: automatic on magnetron filament circuit;

Further with reference to multi-modal applicators, they are resonant cavities in which, unlike what happens in mono-modal cavities, there are many ways otherwise conformed, that resonate at frequencies near operative ones. For this reason, these modes are simultaneously excited with considerable intensity. In fact, a field in a multi-modal cavity can be seen as a result of the superposition of a large number of waves which propagate in different directions, due to the multiple reflections from the walls.

Multi-modal applicators have then the following characteristics:

They are suitable for bulky subjects treatment;

Their size is often determined by the size of the material to be treated;

They have high efficiency;

They are adaptable to both continuous and discontinuous treatments;

From the point of view of human protection from certain biological effects of electromagnetic fields, the whole plant, in the configuration described, was designed to ensure the continuity of electromagnetic shielding upstream and downstream of microwave treatment. This means that all mechanical coupling interconnections are designed to ensure electrical continuity along the entire abutment perimeter, and that input and output devices of material from the treatment module (see also FIGS. 1.2 and 2) are provided with metallic carters with conductive braid that is interposed between the structure which is anchored as constituting an extension of electromagnetic shield (closed volume). In this way, in addition to achieve a considerable reduction of electromagnetic field scattering in the environment, namely to ensure values contained within limits imposed by mandatory provisions and regulations on the subject, they contain fumes of thermally processed organic origin.

Moreover, where it should prove necessary to collect percolate in any point of the reactor, output collection will be suitably equipped with waveguides, having a cut off frequency compatible with the one of the generators, in order to avoid microwave leakage. Having circular cross section and a length calculated as a function of the cut off frequency (cut off), waveguides carry out an effective crossing of electromagnetic screen to allow the passage of fluids without compromising shield efficiency thereof in terms of shielding attenuation to the specific operative frequency.

Type, placement, and construction methods of materials and waveguides are optimized for maximum irradiation efficiency, experimentally verified by means of reflected waves measurement; the power fed into the treatment chamber is the highest possible without occurrence of reflected waves, for each type of material (fine calibration of radiated power); frequencies used are optimal for acting on water and carbon molecules constituting the organic origin.

The stirrer also has the dual function of moving the "bolus" of product to be treated and make it homogeneous, thanks to the double helix which also allows a continuous horizontal material redistribution; this allows maximum uniformity of treatment, also thanks to variable speed motor.

The stirrer conformation also allows an effective and complete product unloading phase; at the end of the exhaust phase, the residual material is negligible.

For those products which tend to lump together on the reactor bottom a lump breaker is installed, for example a marine propeller type or "chopper" with counter-blades, in order to ensure a quality fertilizer free of macro inclusions.

Thermal control system is constituted by a gap placed on the reactor outer wall (or half-tube, flushing with hot water, in order to maintain the product within the optimum temperature range for the humification provided by the process).

In order to improve the system energy efficiency, the heat produced by irradiation heads (water-cooled), can be used to heat or preheat the material to be treated.

The hollow space is thermally insulated with material certificate, in turn protected by a stainless steel or aluminium plate, to ensure the cleaning of the machine exterior.

Reactor loading and unloading systems are constituted by servo-operated valves managed by the PLC system to allow the operations in a completely automatic way (for example during the night).

Essentially, the reactor is loaded from the upper side by means of an endless screw, with open inlet valve and closed outlet lower valve: on reaching the preset weight (measured by the load cell), the loading screw is stopped, the inlet valve is closed and the treatment begins.

At the end of the treatment, the outlet valve opens and the unloading endless screw is started, until the complete emptying of the machine, always measured by the load cell, up to restart the cycle.

Vapour extraction system allows to maintain the temperature controlled (due to the latent heat of vaporization) and to reduce the relative humidity of the finished product: extracted vapours are conveyed to suitable treatment system and abatement.

Dosing and moistening systems, connected to dosing pumps, allow users to enter the reagents for process parameters control and cycle end disinfection systems.

As regards the product obtained by means of process and plant of the invention, it is already described above that, according to the type of input material and to used activators, it is possible to obtain mixtures containing stabilized organic substances rich in humines, humic acids and fulvic acids. Further detailed considerations are reported below.

For natural organic substance it is generally intended all organic substances found in nature. When it comes to organic matter, humus or humic substance it is meant a huge number of molecules of different nature and origin, specifically indicating, however, the component (non-living) which derives from microbial activity. By means of the present process the substance derives from physical and chemical transformations which all substances containing carbon undergo.

Organic substance evolution depends on the totality of process which biological residues undergo, passing in an accelerated way to humification and mineralization and to the interaction between the two. Degradation speed of organic substance in nature is affected by molecules intrinsic resistance, by interaction with mineral fragments, by very stable complexes which determine states of aggregation and stability that slow or even prevent microbial degradation processes of organic material.

In non-fermentative process object of the invention, the result is a constant fast and stable degradation able to overcome the above described problems.

In the process of the invention labile fraction of organic matter composed of cellular biopolymers such as carbohydrates, amino acids, peptides, sugars, lipids and more difficultly metabolisable structures such as waxes, fats, resins, lignins and hemicelluloses, derives from physico-chemical residues degradation of vegetable and animal organisms and for this reason it is free from constraints and variables of biological methods. This fraction forms about 25% of total organic matter. While the humified fraction constitutes almost 65% of organic substance and it is the most stable component. The two components, closely interrelated one to each other, are part of a dynamic use process transformed organic matter; in the product of non-fermentative origin object of the invention, organic substances are more easily assimilated by vegetable crops compared to the product produced by fermentation of known type. In fact, during experimental trials the effect of the product obtained in laboratory was tested on legume crops, obtaining on three tested growth parameters increments equal and/or higher than 50% for each enzyme. Product action in full field on spontaneous herbs and greenhouse crops of tomatoes was also tested; the results indicate an increase in plant growth, productivity and greater responsiveness to fungal and viral attacks.

Humic substances derived from accelerated physico-chemical degradation tend to associate in complex organic structures, more stable, both as compared to initial materials, than the ones processed by fermentation processes.

The process product object of the invention significantly shows the presence, in obtained humic substances, of relatively smaller products compared to products from known fermentation processes. The obtained organic materials, independent from each other, are constituted by associations of different molecules of low molecular weight.

In extreme synthesis the product obtained is a mixture of weakly associated molecular aggregates, having molecular dimensions which are up to ten times smaller than products of known composting plants. This determines the fact that the product is different from those of known type, in particular, for its molecular structure (smaller components) of the humic substances. This characteristic makes it an organic product that has properties of biostabilized fertilizer more assimilable than conventional fertilizers by the cultures in which it is used.

Humic characteristics, such as chemical composition, molecular structure of the constituents, variety of functional groups will vary depending on the origin of the organic material, while the size of molecular aggregates is strictly dependent on the used process. These results were also supported by spectroscopic analysis, in particular from nuclear magnetic resonance spectroscopy of carbon-13 solid phase (CPMAS_13 C-NMR).

Alternative embodiments of described non-limiting example are possible, without departing from the protection scope of the present invention, comprising all equivalent embodiments for a person skilled in the art.

Elements and features shown in various preferred embodiments can be combined without leaving the scope of protection of the present invention.

There are evident benefits from the application of the present invention.

Fast humification process applied to organic material, vegetable and/or animal (refuse-solid waste) allows to obtain in about an hour, without criticalities (formation of odours, percolates), a level of humification which in conventional natural fermentation process is obtained in about 60-90 days with several critical issues related to typical biological processes (odours, percolates, instability of products). It is worth underlining that outlet product of vegetable and animal origin has phytostimulating characteristics, which from a statistic point of view are significantly higher than the compost produced by means of a traditional method; the product and its process have reliability, uniqueness and innovation of extraordinary importance. The same process, with a change in the forced liquid recirculation, has been tested with success on industrial liquid waste which at present is destined for disposal as non-biodegradable.

The radio frequencies treatment process can be used for numerous types of organic waste, among which we can mention:

Wet organic fraction of municipal waste;
Animal by-products, slaughter waste;
Vegetable by-products from companies, firms, supermarkets, food industries, etc.
Zootechnical water waste, digestates from biogas plants,
Domestic waste sewage, treated sludge,
Organic liquid waste from industrial processes (food, canning, etc.),
Organic liquid and solid waste (civil, industrial, etc.)
Any other solid or liquid waste containing organic carbon in different molecular forms.

The described process has been tested in laboratory tests the results of which have shown that the process is reliable and repeatable and can be employed for the treatment of any organic waste.

In summary the process is presented as an alternative to known decomposition process, overcoming it for some special features: the wide range of treatable products, the reliable repeatability of results in absence of critical problems typical of composting traditional method.

From the above description those skilled in the art will be able to embody the invention without introducing any further constructive details.

What is claimed is:

1. A non-fermentative process for fast humification and bio-stabilization of the chemical-physical type of solid and/or liquid, vegetal and/or animal organic material, comprising the following phases:
    an initial phase of preparation and pre-treatment of said organic material, for preparing activated and mixed material brought to a substantially neutral pH;
    a next phase wherein said activated and mixed material at a substantially neutral pH is treated in a reactor, in which it is re-mixed and irradiated with radio frequencies with MW power output ranging from 2.0 kW to 6.0 kW conveyed by waveguides for a time period ranging from 20 to 90 minutes, introducing fast degradation of intact cells of complex molecules of said organic material into simpler and stable molecules with short chain molecular structures, and stabilization in degraded cells of said organic material, so as to block a fermentative process;
    a final phase of post-processing the material treated in the reactor, adapted for producing a biostabilized organic product.

2. The process according to claim 1, wherein said initial phase comprises:
    eliminating extraneous fractions from said organic material;
    conveying said organic material into an stirrer/shredder/mixer in order to reduce it to a size consistent with the material to be treated;
    injecting an additive/activator into the material being stirred, and letting it act for a contact time depending on the additive/activator.

3. The process according to claim 1, wherein said additive/activator is a compound containing: Calcium, Iron, Nitrogen, Magnesium, Zinc, Nickel, Chrome, Copper, Cobalt, Phosphorus, and/or Oxygen.

4. The process according to claim 1, wherein said phase of treating in a reactor comprises:
    generation of microwave energy;
    waveguide propagation of said microwave energy in an application area;
    reflection of said microwave energy in said application area, comprising mixing the material with a mechanical mode stirrer.

5. The process according to claim 1, wherein said final post-processing phase comprises one or more phases of humidity rate correction, concentration, declotting or pelletization, for the production of said biostabilized organic product.

6. The process according to claim 1, wherein said substantially neutral pH is within a range of values between pH 6.5 and pH 7.5.

* * * * *